US005735033A

United States Patent [19]

Marugg

[11] Patent Number: 5,735,033

[45] Date of Patent: Apr. 7, 1998

[54] VERSATILE PULLING TOOL

[76] Inventor: Martin Marugg, 46 Tromley Rd., East Windsor, Conn. 06088

[21] Appl. No.: 475,962

[22] Filed: Jun. 7, 1995

[51] Int. Cl.$^{6}$ .............................. B23P 19/04; B23P 19/00

[52] U.S. Cl. ................................. 29/254; 29/258; 29/259; 29/261; 29/426.5

[58] Field of Search .............................. 29/426.5, 898.08, 29/258, 259, 260, 261, 254

[56] References Cited

U.S. PATENT DOCUMENTS

| | | | |
|---|---|---|---|
| 1,709,913 | 7/1929 | Kaplan | 29/261 |
| 1,891,869 | 12/1932 | Cox | 29/261 |
| 1,925,634 | 9/1933 | Hall | 29/261 |
| 4,117,581 | 10/1978 | Brodic . | |
| 5,255,435 | 10/1993 | Shultz . | |

*Primary Examiner*—S. Thomas Hughes
*Assistant Examiner*—Tisa Stewart
*Attorney, Agent, or Firm*—Fishman, Dionne, Cantor & Colburn

[57] ABSTRACT

A puller comprising a hub having at least three load blocks disposed and retained thereabout by upper and lower end caps is presented. The load blocks are retained about the hub by the end caps so as to allow individual positioning of the load blocks at any circumferential position about the hub. A pressure bolt or screw extends through the center of the hub for providing the pulling force. The grippers or jaws are attached at the respective load blocks. In a preferred embodiment, the grippers comprises an external gripping member and an internal gripping member interconnected by a pair of load linking members. The gripper members each including respective article engaging surfaces or hooks.

14 Claims, 8 Drawing Sheets

VERSATILE PULLING TOOL

BACKGROUND OF THE INVENTION

The present invention relates to pullers for removing such items as bearings and housings from shafts. More specifically, the present invention relates to an improvement in pullers which allows for complete independent radial placement freedom of the puller grippers.

Pullers having radially fixed and limited grippers are known. U.S. Pat. No. 4,117,581 to Brodie discloses three jaws pivoted on a head carrying a pressure screw or bolt. One jaw is pivotally secured to one side of the head and the other two jaws are normally situated at 120° one upon each side of the first jaw and are also pivotally secured to the head. These two jaws are movable to a position in spaced and parallel relationship opposite to the said first jaw and also to swing the first jaw between these two jaws so that the puller can be used as an internal puller. This movement can be achieved either by unbolting the two jaws and repositioning same or using a U-bolt attachment which permits the two jaws to be slid from one position to another thus enabling the puller to be used as a two or three-jaw puller and upon external or internal objects to be pulled. U.S. Pat. No. 5,255,435 to Shultz discloses an apparatus which includes an elongate bearing drive shaft; an adjustably sized mandrel which includes one or more radially fixed bearing drive shoulders, a mandrel spreader for adjusting the mandrel drive shoulder to a predetermined dimension; and a collar or clamp ring for limiting the mandrel to a maximum outer dimension surrounding an outer surface of the bearing, without substantial slippage, during the removal and insertion steps.

The prior art grippers being limited in their radial positioning are often incompatible with various structural and cosmetic geometries of the parts to be pulled. More specifically, the various structures or geometries interfere with the grippers of a particular puller, thus preventing attachment of the grippers. Typically, a puller designed for the particular part to be pulled is required. Accordingly, a need exists for a more versatile puller capable of accommodating the various structures and geometries of the part to be pulled.

SUMMARY OF THE INVENTION

The above-discussed and other drawbacks and deficiencies of the prior art are overcome or alleviated by the puller of the present invention. In accordance with the present invention the puller comprises a hub usually having three (two or more) load blocks disposed and retained thereabout by upper and lower end caps. The load blocks are retained about the hub by the end caps so as to allow individual positioning of the load blocks at any circumferential position about the hub. A pressure bolt or screw extends through the center of the hub for providing the pulling force. The grippers or jaws are attached at the respective load blocks.

During use, the grippers are positioned both circumferentially and radially (i.e., inwardly or outwardly) on a bearing housing or other part to be pulled with the bearing end of the bolt positioned on the shaft of that part. Thereafter, the bolt is rotated to pull the hub and therefore the grippers upwardly, thereby pulling the part away from the shaft thereof.

In a preferred embodiment, the grippers are reversible, thereby providing an external gripping configuration and an internal gripping configuration, which are interconnected to the load blocks by a pair of load linking members. The gripper members each including respective article engaging surfaces or hooks.

In accordance with an alternate embodiment, the puller comprises a hub usually having three (two or more) gripper devices disposed and retained thereabout by a generally cylindrical sleeve. Accordingly, the gripper devices are retained about the hub by the sleeve so as to allow individual positioning of the gripper devices at any circumferential position about the hub. A pressure bolt or screw extends through the center of the hub for providing the pulling force.

During use, the gripper devices are positioned both circumferentially and radially (i.e., inwardly or outwardly) on a bearing housing or other part to be pulled and retained thereat by the sleeve. The bearing end of the bolt is positioned on the shaft of that part. Thereafter, the bolt is rotated to pull the hub and therefore the gripper devices upwardly, thereby pulling the part away from the shaft thereof.

The gripper devices comprise a curved or partly cylindrical body portion having upper inwardly extended tabs which are held about the body portion, between the end portions, of the hub by the sleeve. A C-shaped channel is defined by lower inwardly extending tabs. During use, the lower tab engages a surface of a part being pulled. While the above description relates to external pulling, it will be appreciated that lower outwardly extending tabs may be employed, whereby the puller could be utilized for internal pulling.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

FIGS. 2A–C are views of the hub of the puller of FIG. 1 wherein FIG. 2A is a side elevation view thereof, FIG. 2B is a top view thereof and FIG. 2C is another side elevation view thereof;

FIGS. 3A–C are views of a load block of the puller of FIG. 1 wherein FIG. 3A is a side elevation view thereof, FIG. 3B is a top view thereof and FIG. 3C is an inner end view thereof;

FIGS. 4A–C are views of an end cap of the puller of FIG. 1 wherein FIG. 4A is a side elevation view thereof, FIG. 4B is another side elevation view thereof and FIG. 4C is a bottom view thereof;

FIGS. 5A–C are views of a gripper of the puller of FIG. 1 wherein FIG. 5A is a side elevation view thereof, FIG. 5B is an inner end view thereof and FIG. 5C is a top view thereof;

FIGS. 8A–C are views of a gripper device of the puller of FIG. 7 wherein FIG. 8A is a side elevation view thereof, FIG. 8B is a top view thereof and FIG. 8C is an inner end view thereof;

FIGS. 10A–C are views of a gripper device of the puller of FIG. 9 wherein FIG. 10A is a side elevation view thereof, FIG. 10B is a top view thereof and FIG. 10C is an inner end view thereof.

DESCRIPTION OF THE PREFERRED EMBODIMENTS

Figure 1:
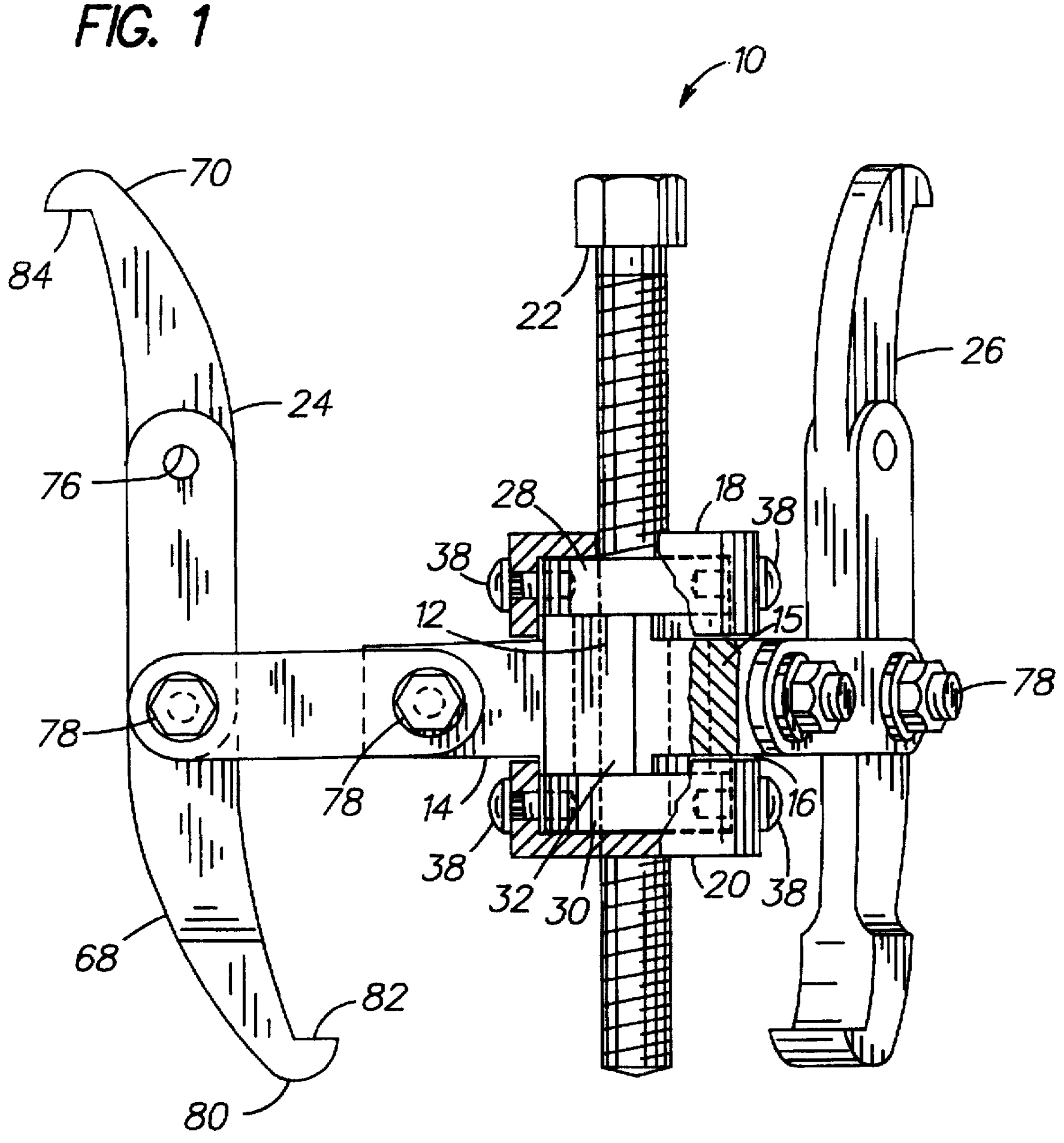
FIG. 1 is a side elevation view partly cut away of a puller in accordance with the present invention.

Referring to FIGS. 1 and 1 A, a puller in accordance with the present invention is shown generally at 10. Puller 10 comprises a hub 12 having three load blocks 14–16 disposed about hub 12 and retained thereabout by upper and lower end caps 18 and 20. Load blocks 14–16 are retained about hub 12 by end caps 18 and 20 so as to allow individual positioning of load blocks 14–16 at any circumferential position about hub 12. A pressure bolt or screw 22 extends through the center of hub 12 for providing the pulling force, as is well known. Grippers or jaws 24–26 are interconnected, by a pair of load linking members 27 and 29, to load blocks 14–16, respectively.

During use, grippers 24–26 are positioned both circumferentially and radially (i.e., inwardly or outwardly) on a bearing housing or other part (not shown) to be pulled with bolt 22 positioned on the shaft (not shown) of that part. Thereafter, bolt 22 is rotated to pull hub 12 and therefore grippers 24–26 upwardly, thereby pulling the part away from the shaft thereof, as is well known.

Figure 1A:
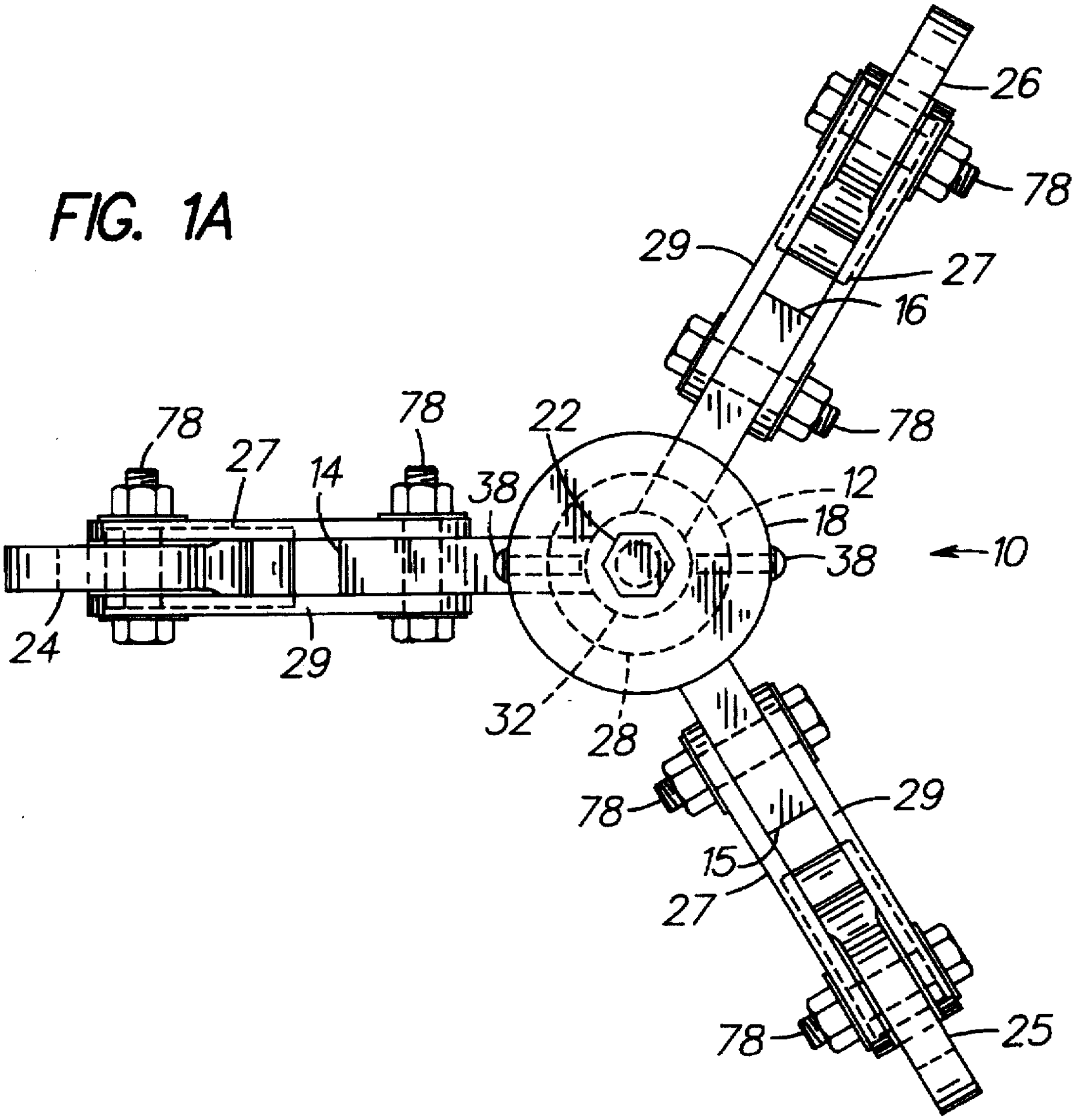
FIG. 1A is a top view of the puller of FIG. 1.
Figure 2B:
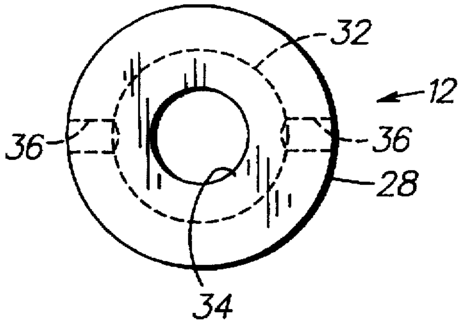
Figure 2A:
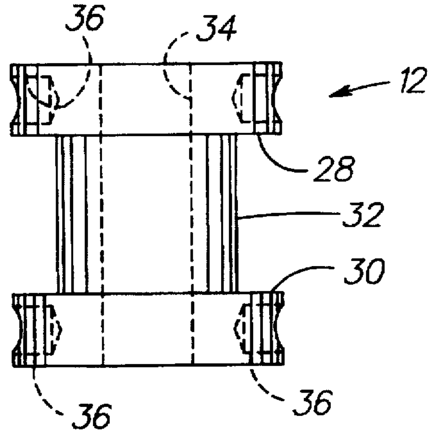
Figure 2C:
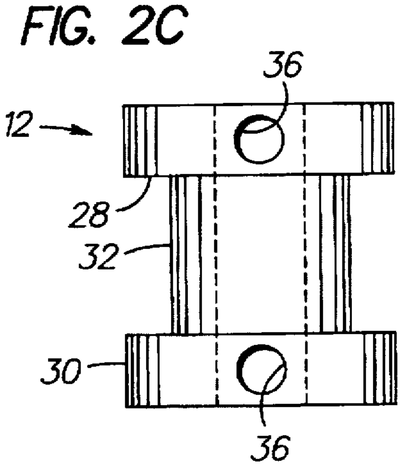

Referring to FIGS. 2A–C, hub 12 is generally shown. Hub 12 is generally shaped like a spool. Hub 12 comprises upper and lower generally cylindrical end portions 28 and 30 with an inwardly stepped cylindrical body portion 32 therebetween. Hub 12 has a threaded opening 34 extending longitudinally therethrough for rotatably coupling with bolt 22. End portions 28 and 30 each further include a pair of tapped holes 36 for receiving retaining screws 38 (FIGS. 1 and 1A).

Figure 3B:
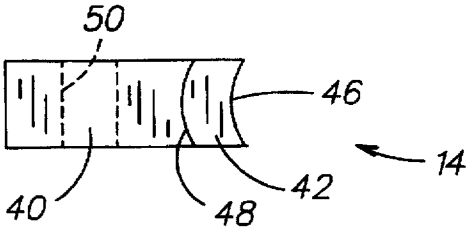
Figure 3A:
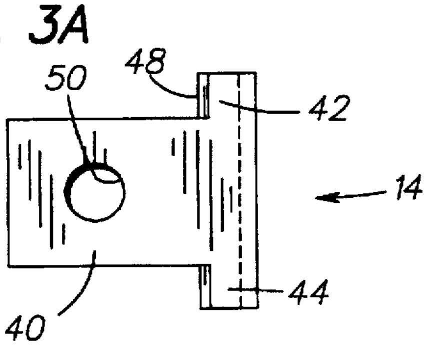
Figure 3C:
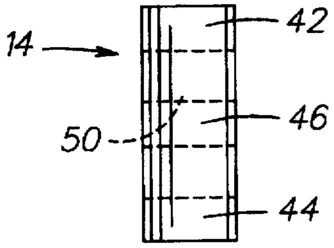

Referring to FIGS. 3A–C, load block 14 is shown with load blocks 15 and 16 being the same. Load block 14 comprises a generally rectangular body portion 40 having upwardly and downwardly extending tabs 42 and 44, respectfully, at an inner end thereof. A surface 46 defining the inner end of portion 40 and tabs 42, 44 is curved to conform to the outer curvature of body portion 32 of hub 12. An outer surface 48 of tabs 42 mad 44 is also curved. Body portion 40 of load block 14 has a mounting hole 50 extending laterally therethrough.

Figure 4A:
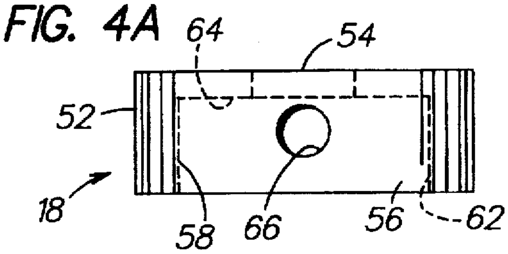
Figure 4B:
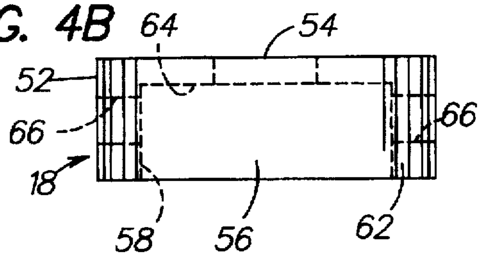
Figure 4C:
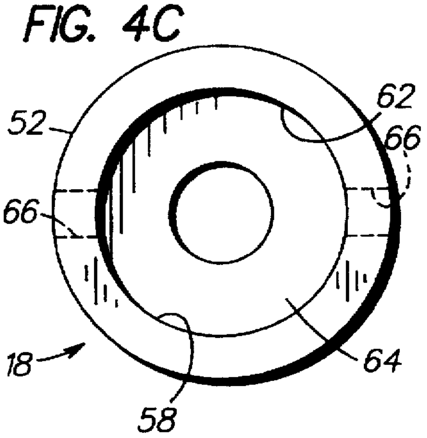

Referring to FIGS. 4A–C, end cap 18 is shown with end cap 20 being the same. End cap 18 comprises a generally cylindrically shaped body 52 having an exterior end surface 54 and an exterior outer circumferential surface 56. A cylindrical recess 58 is defined in body 52 forming an interior surface 62 opposite surface 56 and an interior surface 64 opposite surface 54. Mounting holes 66 extend through surfaces 56 and 62.

Each end cap 18 and 20 is mounted on respective end portions 28 and 30 of hub 12. Retaining screws 38 extend through holes 66 in caps 18 and 20 and are retained in holes 36 of hub 12. The cylindrical wall defined by surfaces 56 and 62 of each end cap 18 and 20 extends beyond the respective end portions 28 and 30 of hub 12 defining a cylindrical groove between body portion 32 and surface 62. Respective tabs 42 and 44 of each load block 14–16 are received entirely in these grooves, as is clearly shown in FIGS. 1 and 1A.

Figure 5C:
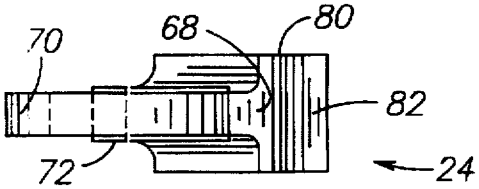
Figure 5A:
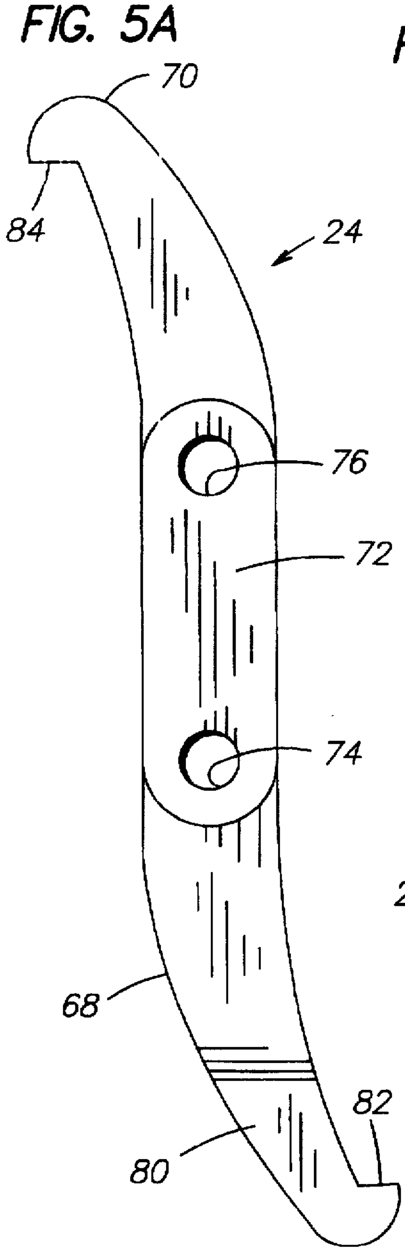
Figure 5B:
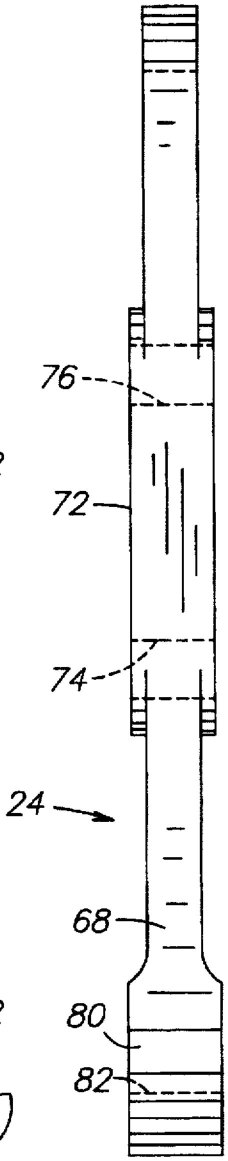

Referring to FIGS. 5A–C, gripper 24 is shown with grippers 25 and 26 being the same. Gripper 24 comprises an external gripping member 68 integrally connected by a bossed portion 72 to an internal gripping member 70. Portion 72 includes mounting holes 74 and 76, whereby gripper 24 is attached to one end of respective load links 27, 29 by a fastener 78 (FIGS. 1 and 1A). The other end of the respective load links 27 and 29 is attached to load block 14 by a fastener 79 (FIGS. 1 and 1A). FIGS. 1 and 1A show grippers 24–26 configured for use of external gripping members 68. It will be appreciated that grippers 24–26 can be connected at holes 74 or 76 thereby providing the ability to take a so-called short reach or long reach. It will be further appreciated that grippers 24–26 can be configured for use of the internal gripping members 70 by reversing the grippers and connecting them at holes 74 or 76.

Gripper member 68 comprises a generally curved member having an upper end thereof connected to bossed portion 72, and an enlarged lower end portion 80 which includes an article engaging, inwardly extending, surface or hook 82, as is known. Portion 80 is also curved along the interior surface thereof to assure sufficient contact with a part being pulled. Gripper member 70 comprises a generally curved member having one end thereof connected to bossed portion 72, and another end thereof which includes an article engaging, outwardly extending, surface or hook 84, as is known.

It will be appreciated, that it is within the scope of the present invention that a single gripping member be attached to each of the load blocks, in place of the grippers described above. Further, prior art Dippers may also be attached to the load blocks and thereby benefit for the individual rotational positional freedom of the puller of the present invention.

Figure 6:
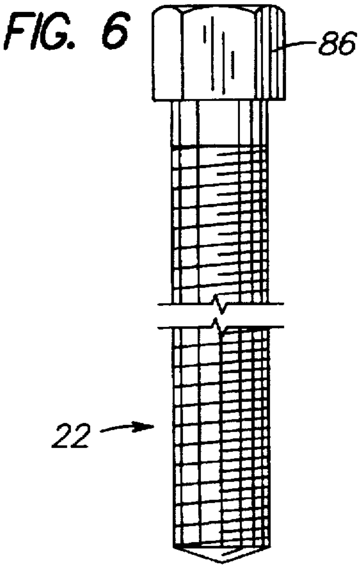
FIG. 6 is a side elevation view of a pressure bolt of the puller of FIG. 1.

Referring to FIG. 6, pressure bolt 22 includes a standard hexagonal head 86 at the upper end of a screw threaded shank 88 extending downwardly therefrom for engaging the screw threaded opening 34 in hub 12.

The puller of the present invention comprises components of machine hardened steel, as is well known in the art.

Figure 7A:
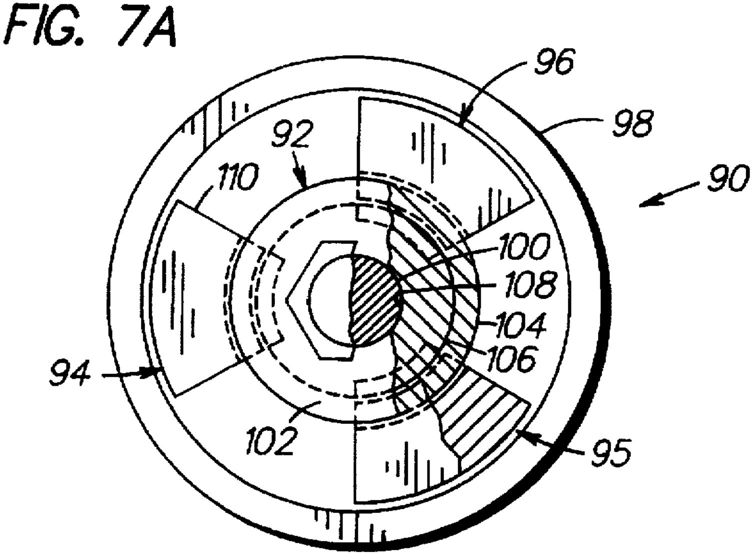
FIG. 7A is a top view partly cut away of the puller of FIG. 7.
Figure 7:
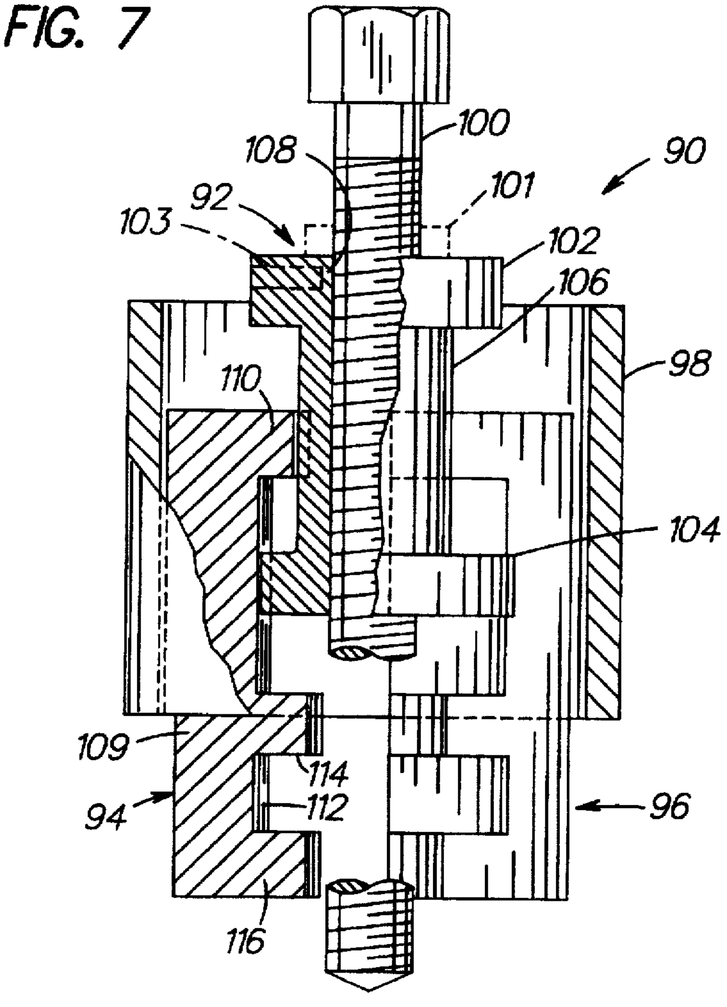
FIG. 7 is a side elevation view partly cut away of an external puller in accordance with an alternate embodiment of the present invention.

Referring to FIGS. 7 and 7A, an external puller in accordance with an alternate embodiment of the present invention is shown generally at 90. Puller 90 comprises a hub 92 having three gripper devices 94–96 disposed about hub 92 (which is similar to hub 12 described above) and retained thereabout by a generally cylindrical sleeve 98. Accordingly, gripper devices 94–96 are retained about hub 92 by sleeve 98 so as to allow individual positioning of devices 94–96 at any circumferential position about hub 92. A pressure bolt or screw 100 extends through the center of hub 92 for providing the pulling force, as is well known.

During use, gripper devices 94–96 are positioned circumferentially on a bearing housing or other part (not shown) to be pulled and retained thereat by sleeve 98. Bolt 100 is positioned on the shaft (not shown) of that part. Thereafter, bolt 100 is rotated (and hub 92 may be held at a hexagonal head 101 or hole 103, as is well known) to pull hub 92 and therefore gripper devices 94–96 upwardly, thereby pulling the part away from the shaft thereof, as is well known.

Hub 92 is generally shaped like a spool. Hub 92 comprises upper and lower generally cylindrical end portions 102 and 104 with an inwardly stepped cylindrical body portion 106 therebetween. Hub 92 has a threaded opening 108 extending longitudinally therethrough for rotatably coupling with bolt 100.

Figure 8B:
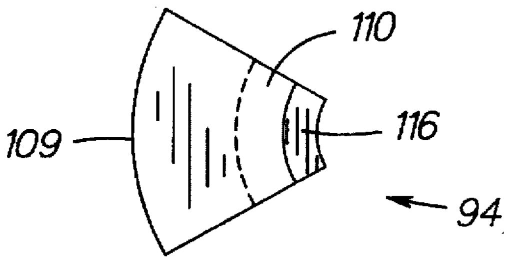
Figure 8A:
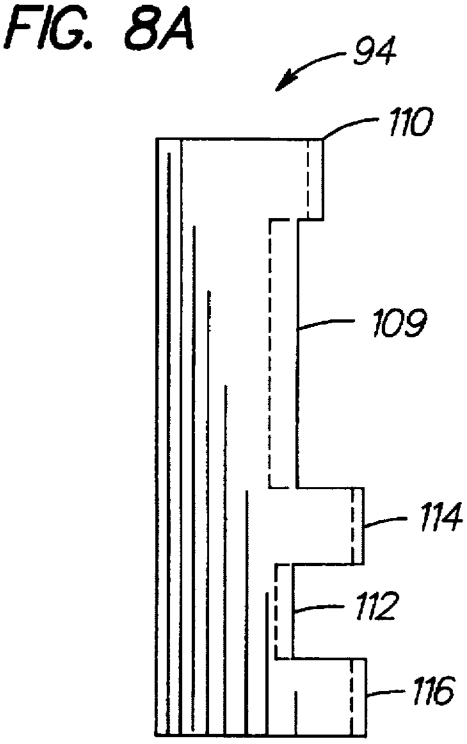
Figure 8C:
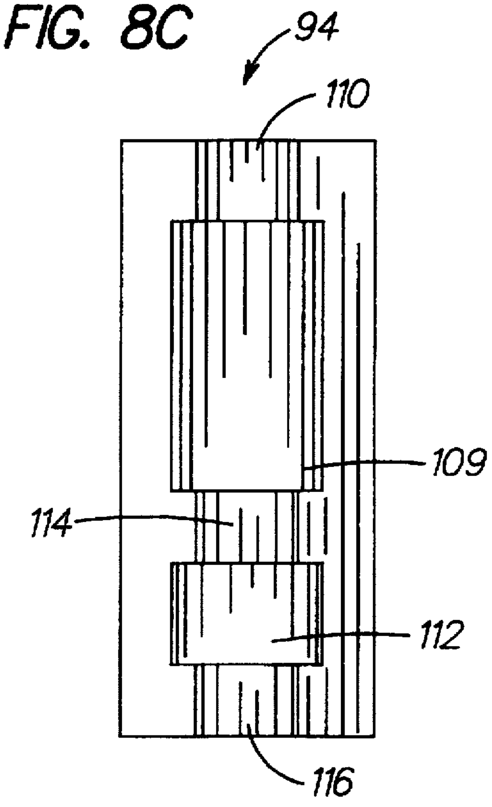

Referring to FIGS. 8 A–C, gripper device 94 is shown with gripper devices 95 and 96 being the same. Gripper device 94 comprises a curved or partly cylindrical body portion 109 having upper, concave, inwardly extended tabs 110 which are held about body portion 106, between end portions 102 and 104, of hub 92 by sleeve 98. A C-shaped channel 112 is defined by lower inwardly extending tabs 114 and 116. During use, tab 116 engages a surface of a part being pulled. The distance between tabs 110 and 114 is about the same as the distance between end portion 102 and 104.

Figure 9A:
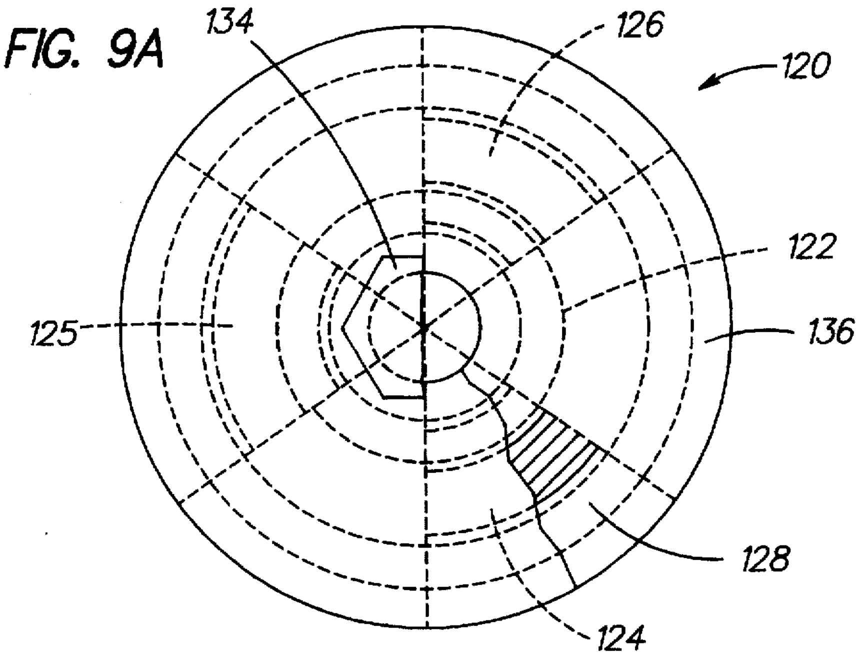
FIG. 9A is a top view partly cut away of the puller of FIG. 9.
Figure 9:
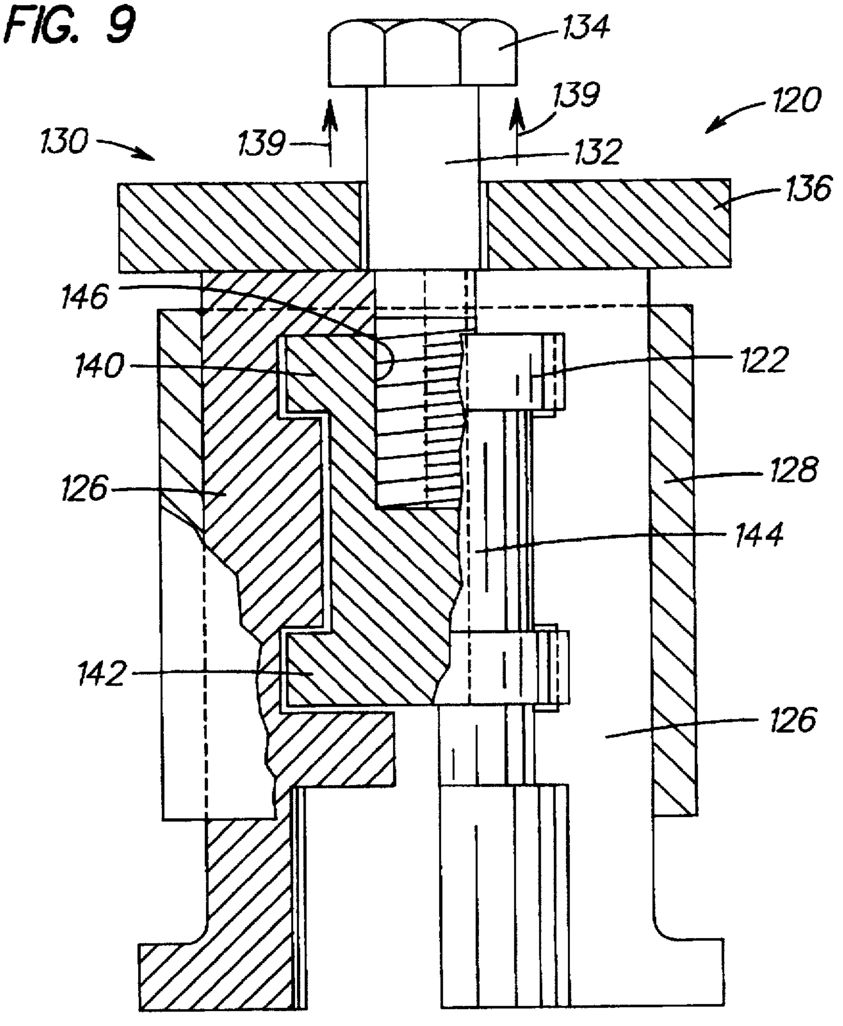
FIG. 9 is a side elevation view partly cut away of an internal puller in accordance with an alternate embodiment of the present invention.

Referring to FIGS. 9 and 9A, an internal puller in accordance with still another alternate embodiment of the present invention is shown generally at 120. Puller 120 comprises a hub 122 having three gripper devices 124–126 disposed about hub 122 (which is similar to hub 12 described above) and retained thereabout by a generally cylindrical sleeve 128. Accordingly, gripper devices 124–126 are retained about hub 122 by sleeve 128 so as to allow individual positioning of devices 124–126 at any circumferential position about hub 122. A slide hammer assembly 130 is attached to center of hub 122, as is well known. Slide hammer assembly 130 comprises a shank 132 threaded at the lower end thereof for engaging the threaded opening in hub 122 and having a head 134 at the upper end thereof. A slide weight 136 is disposed about shank 132. It will be appreciated that any of the above described embodiments of the present invention may also employ a slide hammer assembly in place of the described pressure bolt or screw. Also, it is within the scope of the present invention that a hydraulic device or any other suitable device for pulling the hub away from the device which the article is to be removed may be employed, such being generally referred to herein as an actuator.

During use, gripper devices 124–126 are positioned circumferentially on a bearing housing or other part (not shown) to be pulled and retained thereat by sleeve 138. Thereafter, slide weight 136 is urged upwardly, as indicated by arrows 139 against head 134 forcing hub 122 and therefore gripper devices 124–126 upwardly, thereby pulling the part away, as is well known.

Hub 122 is generally shaped like a spool. Hub 122 comprises upper and lower generally cylindrical end portions 140 and 142 with an inwardly stepped cylindrical body portion 144 therebetween. Hub 122 has a threaded opening 146 extending longitudinally therein for rotatably coupling with the lower end of shank 132.

Figure 10B:
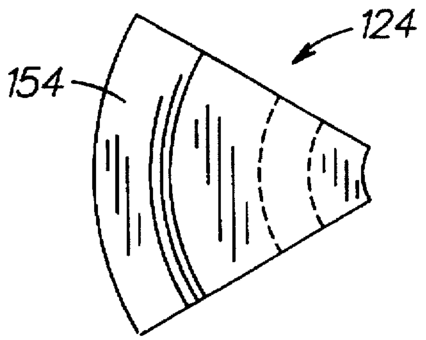
Figure 10A:
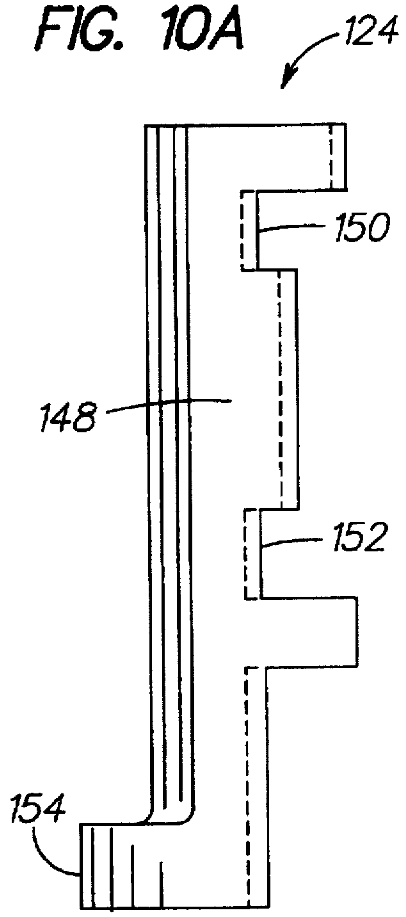
Figure 10C:
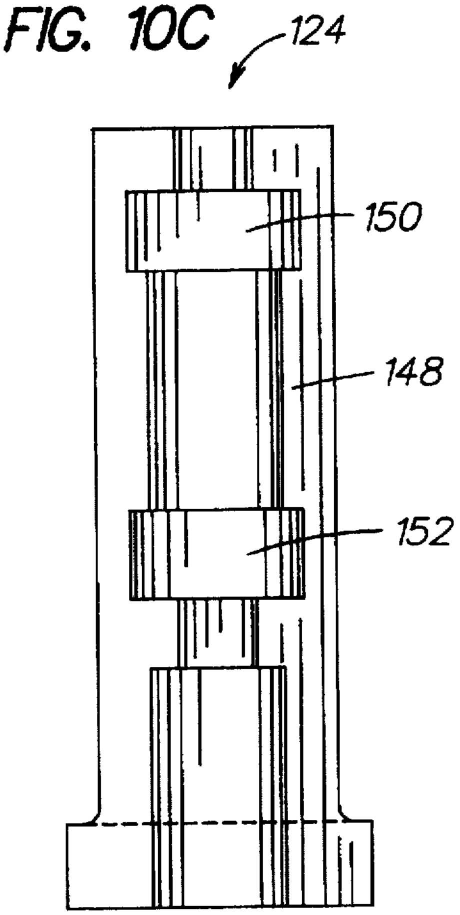

Referring to FIGS. 10 A–C, gripper device 124 is shown with gripper devices 125 and 126 being the same. Gripper device 124 comprises a curved or partly cylindrical body portion 148 having a pair of concave inwardly extended slots 150 and 152 which receive end portions 140 and 142 of hub 122, and is held thereabout by sleeve 128. An outwardly extending tab 154 is defined at the lower end of gripper device 124. During use, tab 154 engages a surface of a part being pulled.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A pulling tool for pulling an article from a device comprising:

a hub having a circumference;

an actuator attached to said hub for pulling said hub away from the device; and at least two grippers mounted on said hub so as to allow unrestricted circumferential positioning of each of said grippers independently about the entire circumference of said hub, each of said grippers including an engagement surface for engaging the article to be pulled.

2. The tool of claim 1 wherein:

said hub includes a threaded opening longitudinally therethrough; and said actuator comprises, a screw threaded shank having a head at one end thereof and a bearing end at the other end thereof, said shank rotatably engaged in said opening in said hub.

3. The tool of claim 1 wherein said grippers are external grippers.

4. The tool of claim 1 wherein said grippers are internal grippers.

5. The tool of claim 1 wherein:

said hub comprises upper and lower end portions with an inwardly stepped portion therebetween; and said tool further comprises, at least two load blocks, each of said load blocks having a body portion with upwardly and downwardly extending tabs at an inner end thereof, said body portion having a corresponding said gripper attached thereto, and upper and lower end caps secured at respective said upper and lower end portions of said hub, respective said upwardly and downwardly extending tabs of each of said load blocks disposed between respective said upper and lower end caps and respective upper and lower end portions of said hub, thereby allowing unrestricted circumferential positioning of said load blocks about said hub.

6. The tool of claim 5 further comprising:

a pair of load linking members attaching each of said grippers to corresponding said load blocks.

7. The tool of claim 1 wherein:

said hub comprises upper and lower end portions with an inwardly stepped portion therebetween;

said grippers each includes an inwardly extending tab at an upper end thereof; and said tool further comprises, a sleeve disposed about said grippers for retaining said inwardly extending tabs of said grippers between said upper and lower end portions of said hub while allowing unrestricted circumferential positioning of said grippers about said hub.

8. The tool of claim 7 wherein each of said engagement surfaces is defined by an inwardly extending C-shaped channel at a lower end of each of said grippers for external pulling.

9. The tool of claim 1 wherein:

said hub comprises upper and lower end portions with an inwardly stepped portion therebetween;

said grippers each include at least one slot receptive to said upper or lower end portion; and said tool further comprises, a sleeve disposed about said grippers for retaining said upper or lower end portion in said at least one slot while allowing unrestricted circumferential positioning of said grippers about said hub.

10. The tool of claim 9 wherein each of said engagement surfaces is defined by an outwardly extending tab at a lower end of each of said grippers for internal pulling.

11. The tool of claim 1 wherein each of said grippers comprises:

an inwardly curved end having an external engagement surface for externally engaging an article to be pulled and an opposing outwardly curved end having an internal engagement surface for internally engaging an article to be pulled.

12. The tool of claim 1 wherein said actuator comprises:

a slide hammer assembly attached to said hub.

13. The tool of claim 12 wherein:

said hub includes a threaded opening longitudinally therein; and said slide hammer assembly comprises, (1) a shank having a screw threaded lower end and having a head at the other end thereof, said screw threaded lower end rotatably attached to said threaded opening of said hub, and (2) a weight slidably disposed on said shank between said hub and said head.

14. A pulling tool having at least two grippers mounted on a hub having a circumference, said grippers including an engagement surface for engaging an article to be pulled, wherein the improvement comprises:

said at least two grippers mounted to said hub so as to allow independent unrestricted circumferential positioning of each of said grippers about the entire circumference of said hub.

* * * * *